United States Patent [19]

McCurry

[11] Patent Number: 5,150,523
[45] Date of Patent: Sep. 29, 1992

[54] DEADMAN SWITCH ARRANGEMENT FOR A HEDGE TRIMMER

[75] Inventor: Ronald C. McCurry, West Union, S.C.

[73] Assignee: Ryobi Motor Products Corporation, Easley, S.C.

[21] Appl. No.: 728,374

[22] Filed: Jul. 11, 1991

[51] Int. Cl.[5] ..................... B26B 15/00; B27B 17/00; B27B 17/02
[52] U.S. Cl. ......................................... 30/228; 30/382
[58] Field of Search ..................... 30/113, 1, 382, 216, 30/383, 272, 380, 228, 210; 191/1; 172/13; 83/DIG. 1

[56] References Cited

U.S. PATENT DOCUMENTS

| | | | |
|---|---|---|---|
| 3,664,390 | 5/1972 | Mattsson et al. | 30/380 |
| 3,787,742 | 1/1974 | Murphy | 30/228 |
| 3,937,306 | 2/1976 | Vilheim et al. | 30/383 |
| 4,057,900 | 11/1977 | Nagy et al. | 30/382 |
| 4,077,125 | 3/1978 | Fuller | 30/382 |

Primary Examiner—Douglas D. Watts
Assistant Examiner—Paul M. Heyrana, Sr.
Attorney, Agent, or Firm—Brooks & Kushman

[57] ABSTRACT

A deadman switch arrangement for a hedge trimmer wherein the auxiliary handle of the hedge trimmer is provided with a cover member which pivots thereon. The cover member has a camming surface near its pivot point, the camming surface having a ramp which moves an actuating pin inwardly toward the center of the hedge trimmer housing as the cover member is moved toward the auxiliary handle. When moved inwardly of the housing, the actuating pin closes a switch to complete the main power circuit of the hedge trimmer. The cover member is biased away from the auxiliary handle so that if the operator releases the cover member, the hedge trimmer is automatically turned off.

4 Claims, 4 Drawing Sheets

DEADMAN SWITCH ARRANGEMENT FOR A HEDGE TRIMMER

BACKGROUND OF THE INVENTION

This invention relates to motor driven hedge trimmers and, more particularly, to a safety arrangement for such a device.

In recent years, the public has become more safety conscious with regard to motor driven tools, especially those having exposed cutting edges. One such tool is a hedge trimmer which has an exposed cutting blade extending twelve inches or more out of the tool housing. Such a tool typically includes a housing containing a motor, a cutting blade coupled to the motor and extending forwardly out of the housing, a main handle extending rearwardly from the housing, a main power switch having an actuator in close proximity to or on the main handle, and an auxiliary bail-type handle mounted on the housing between the main handle and the blade.

For proper safe operation of the hedge trimmer, the operator should have one hand holding the main handle and the other hand holding the auxiliary handle whenever the motor is energized. It is therefore an object of the present invention to provide an arrangement in a hedge trimmer to insure that both of the operator's hands are properly positioned during operation of the tool.

A "deadman switch" arrangement associated with the auxiliary handle will accomplish the foregoing objective. Such an arrangement includes a normally open secondary switch in series with the main power switch which is arranged so that it is closed only when the auxiliary handle is properly gripped by the operator. It is therefore a more specific object of the present invention to provide such a deadman switch arrangement in a hedge trimmer.

SUMMARY OF THE INVENTION

The foregoing, and additional, objects are attained in accordance with the principles of this invention by providing a deadman switch arrangement associated with the auxiliary handle of a hedge trimmer including a normally open secondary switch in series with the primary power switch of the hedge trimmer and a cover member mounted for pivoting movement on the auxiliary handle. The cover member can move within an angular range between a first position where it closely overlies the auxiliary handle and a second position where it is angularly spaced from the auxiliary handle. There is further provided actuating means mounted on the cover member for closing the secondary switch as the cover member is moved from the second position toward the first position.

In accordance with an aspect of this invention, the actuating means includes a ramped camming surface on the cover member which cooperates with an actuating pin of the secondary switch.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 7:
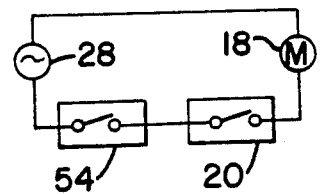
FIG. 7 is a schematic circuit diagram showing the connections of the primary power switch and secondary switch of the hedge trimmer of FIG. 1.

Referring now to the drawings, shown therein is a hedge trimmer, designated generally by the reference numeral 10, having a housing 12 and a cutting blade 14 extending forwardly from the housing 12. The hedge trimmer 10 further includes a main handle 16 secured to the housing 12 and extending rearwardly therefrom. Within the housing 12 is a motor 18 (FIG. 7) for driving the cutting blade 14 in a known manner and there is also provided a primary power switch 20 (FIG. 7) in circuit with the motor 18 for selectively controlling the application of power thereto. The primary power switch 20 is mounted in proximity to the handle 16 and has associated therewith a trigger-type actuator 22 by means of which an operator gripping the main handle 16 can control the primary power switch 20. The hedge trimmer 10 further includes an auxiliary handle 24 supported on the housing 12 between the main handle 16 and the cutting blade 14. The auxiliary handle 24 is of the bail-type and is generally C-shaped so that it straddles the housing 12. The hedge trimmer 10 is also provided with a blade guard 26 supported on the housing 12 closely adjacent the cutting blade 14. Although not shown in the drawings, a line cord can be connected to the hedge trimmer 10 so that power from a source 28 (FIG. 7) can be supplied to the hedge trimmer 10. Alternatively, the hedge trimmer 10 can include batteries. The foregoing describes a conventional construction for the hedge trimmer 10 and no further description of such conventional construction is deemed necessary.

Figure 1:
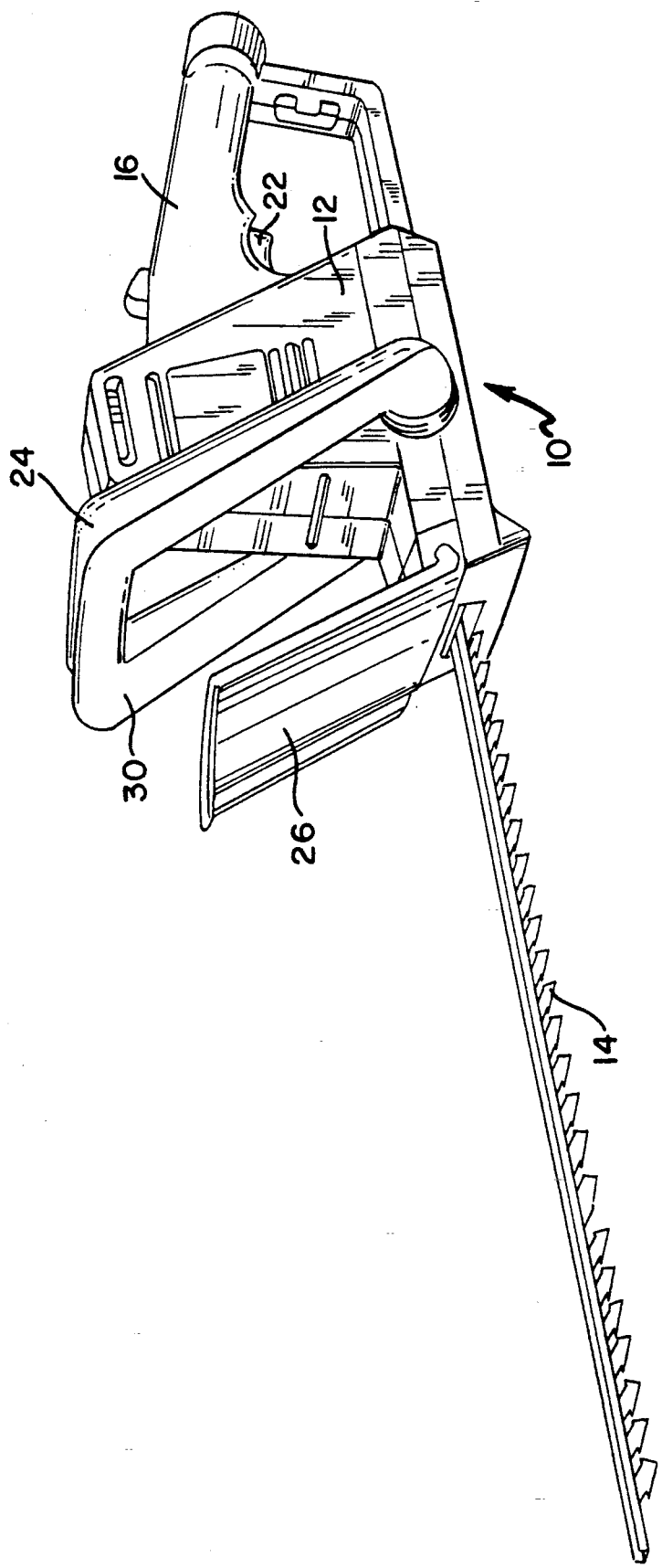
FIG. 1 is a perspective view of a hedge trimmer having incorporated therein a deadman switch arrangement according to this invention.
Figure 2:
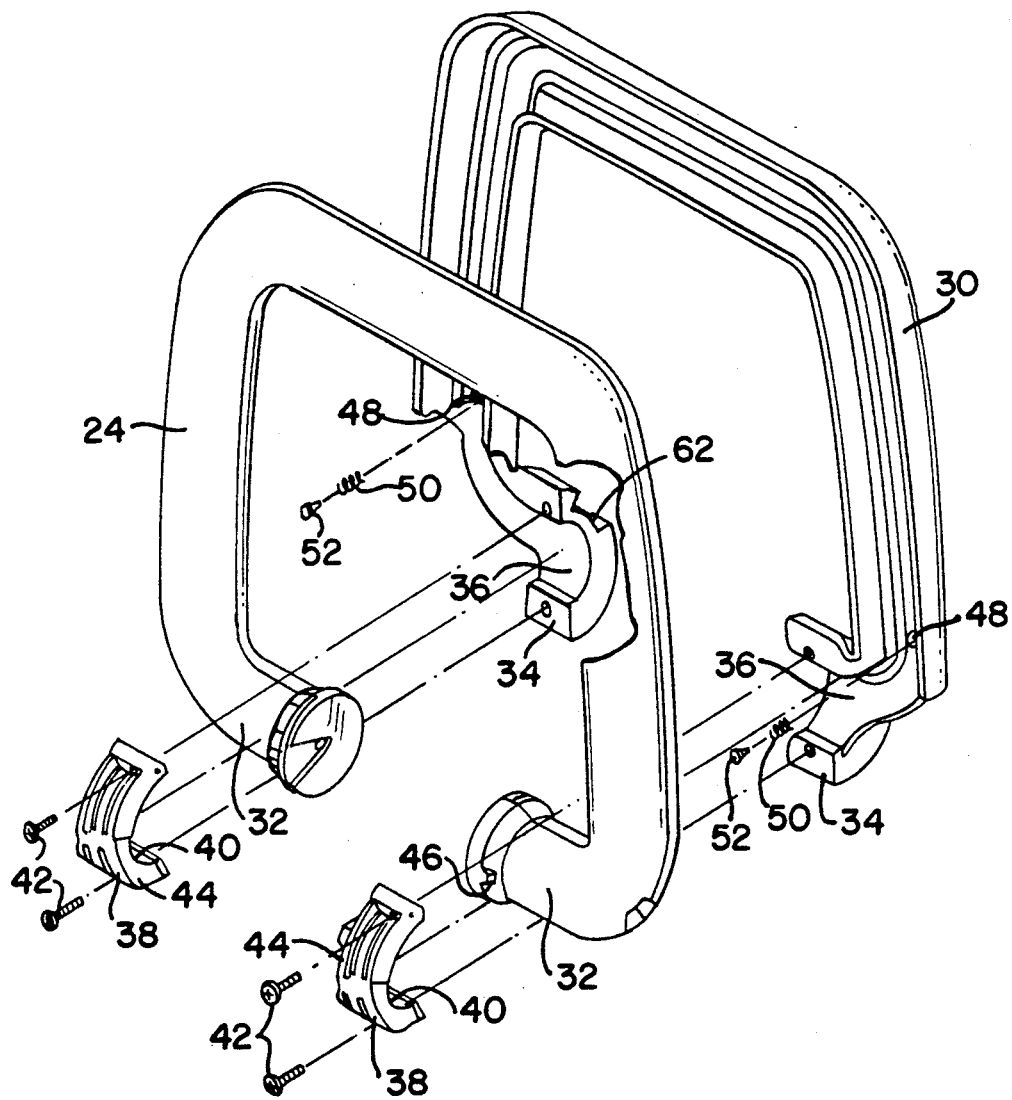
FIG. 2 is an exploded perspective view of the hedge trimmer auxiliary handle and cover member of this invention.

According to this invention, there is provided a cover member 30 which is mounted for pivoting movement on the auxiliary handle 24. To effect such mounting, the auxiliary handle 24 is formed with a pair of regions 32 (FIG. 2) which are adjacent the housing 12 and on opposite sides thereof, the regions 32 being of substantially circular cross section. The cover member 30 is accordingly formed with saddle portions 34 which have surface regions 36 conforming to the exterior surface of the regions 32. A pair of saddle blocks 38 which likewise have conforming regions 40 are on the opposite side of the auxiliary handle regions 32 and are secured to the saddle portions 34 by means of screws 42 to secure the cover member 30 to the auxiliary handle 24 while allowing it to pivot thereon. In order to limit the pivoting of the cover member 30 on the auxiliary handle 24, the saddle blocks 38 are formed with stop grooves 44 and the auxiliary handle 24 is formed with complementary stop tabs 46 which fit in the grooves 44.

Figures 3, 4:
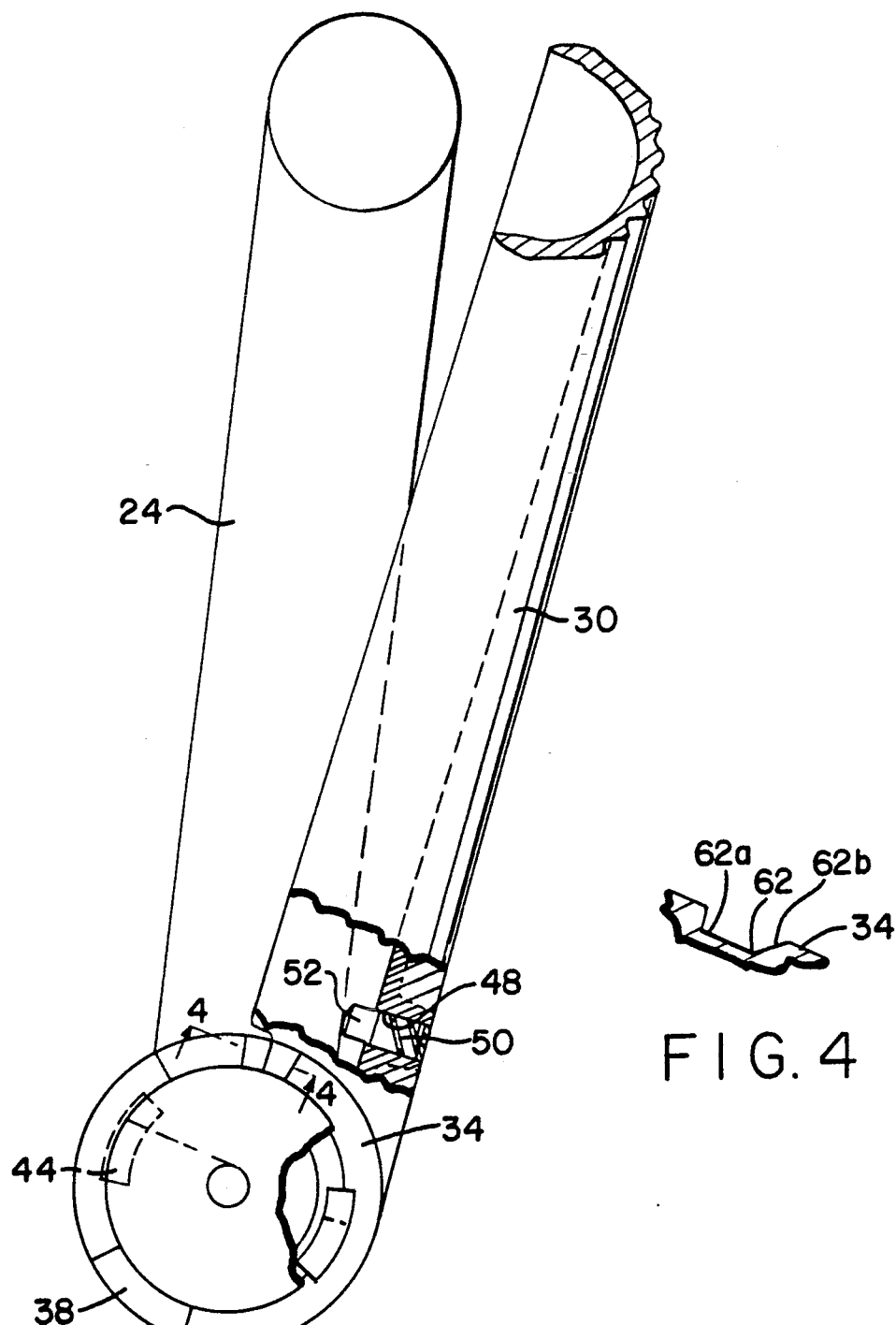
FIG. 3 is a sectional view, partially cut away, showing the cover member mounted on the auxiliary handle.
FIG. 4 is a cross-sectional view of a portion of the cover member taken along the line 4—4 in FIG. 3.
Figure 5:
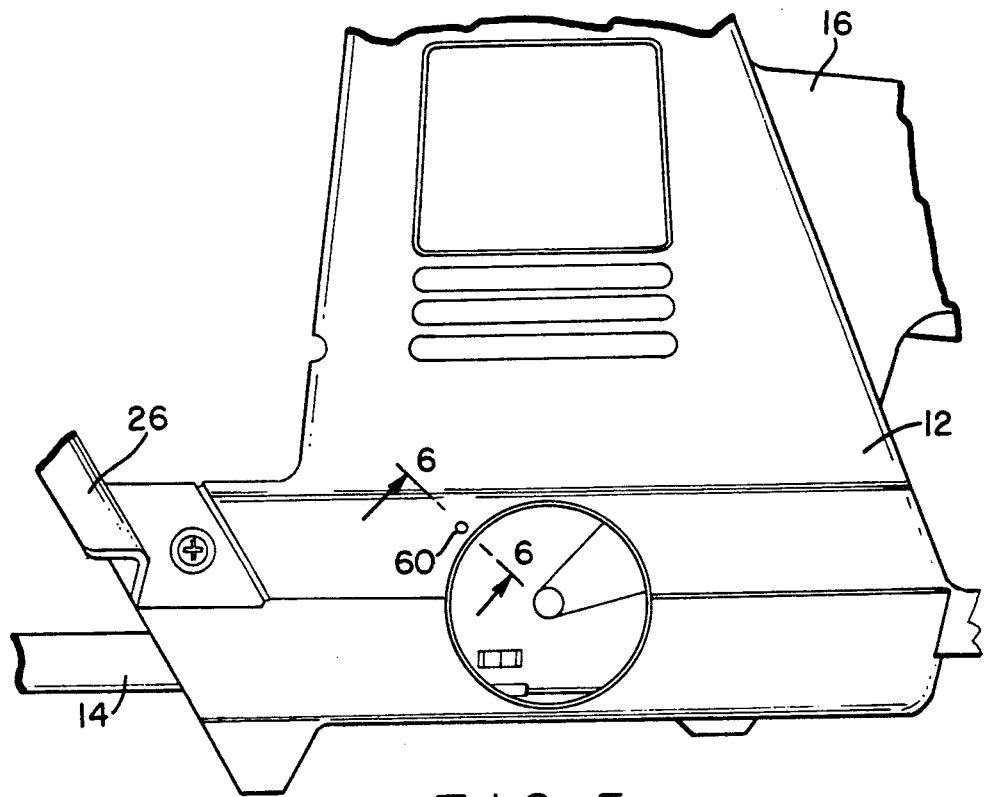
FIG. 5 is a side view of a portion of the hedge trimmer housing showing where the auxiliary handle and secondary switch are mounted.
Figure 6:
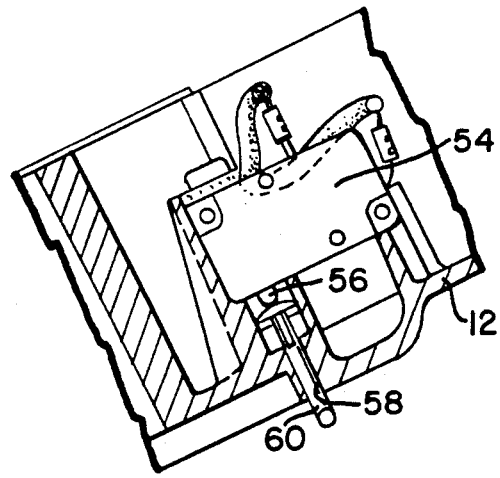
FIG. 6 is a cross-sectional view taken along the line 6—6 in FIG. 5 showing the mounting of the secondary switch within the housing.

The combination of the stop grooves 44 and stop tabs 46 allows the cover member 30 to pivot on the auxiliary handle 24 within an angular range between a first position where the cover member 30 closely overlies the auxiliary handle 24 and a second position where the cover member 30 is angularly spaced from the auxiliary handle 24. The second position is illustrated in FIG. 3. According to this invention, there is provided an arrangement for yieldably biasing the cover member 30 toward the second position. This biasing arrangement includes a counterbore 48 formed in the cover member 30, the counterbore 48 being open toward the auxiliary handle 24. Disposed in the counterbore 48 is a spring member 50, and a pin member 52 is disposed in the counterbore 48 over the spring member 50. The pin member 52 extends out of the counterbore 48 to contact the auxiliary handle 24 when the cover member 30 is within the angular range between the first and second positions so as to yieldably bias the cover member away from the auxiliary handle 24 toward the second position.

To effect the deadman switch function, there is provided a normally open secondary switch 54 in series with the primary power switch 20. The secondary switch 54 is mounted within the housing 12 in close proximity to the auxiliary handle 24. As is common, the switch 54 includes an actuator 56 which extends outwardly from the housing of the switch 54 and is spring biased outwardly so that the switch 54 is maintained in a normally open state. Movement of the actuator 56 inwardly of the housing of the switch 54 causes the switch 54 to close. According to this invention, the hedge trimmer housing 12 is formed with a bore 58 and an actuating pin 60 extends through the bore 58 and at its inner end within the housing 12 is in contact with the actuator 56 of the switch 54. Thus, the actuating pin 60 is essentially an extension of the switch actuator 56. The actuating pin 60 is covered by a saddle portion 34 of the cover member 30. To effect appropriate operation of the secondary switch 54, that part of the saddle portion 34 which covers the actuating pin 60 when the cover member 30 is between its first and second positions is formed with a camming surface 62. As shown in FIG. 4, the camming surface 62 is formed with a first flat portion 62a and a second ramped portion 62b. The camming surface 62 is so configured that when the cover member 30 is in its second position (FIG. 3) where it is spaced from the auxiliary handle 24, the camming surface 62a is over the actuating pin 60 and allows the actuating pin 60 to extend outwardly from the hedge trimmer housing 12. However, when the operator grips the cover member 30 and moves it toward the auxiliary handle 24, the ramped camming surface 62b comes in contact with the actuating pin 60 and causes the actuating pin 60 to be moved inwardly of the hedge trimmer housing 12. This causes the secondary switch 54 to close and allows power to be supplied to the motor 18. Whenever the operator's hand releases the auxiliary handle 24 and the cover member 30, either deliberately or inadvertently, the spring 50 and pin 52 move the cover member 30 away from the auxiliary handle 24 so as to move the camming surface 62 relative the actuating pin 60 so that the actuating pin 60 is allowed to move outwardly from the housing 12 to cause the secondary switch 54 to open, thereby automatically removing power from the motor 18.

Accordingly, there has been disclosed an improved deadman switch safety arrangement for a hedge trimmer. While an exemplary embodiment has been disclosed herein, it will be appreciated by those skilled in the art that various adaptations and modifications to the disclosed embodiment may be made without departing from the spirit and scope of this invention, as defined by the appended claims.

I claim:

1. In a hedge trimmer having a housing, a motor supported within said housing, a cutting blade extending forwardly from said housing and driven by said motor, a main handle secured to said housing and extending rearwardly therefrom, a primary power switch having an actuator supported in proximity to said main handle and in circuit with said motor for selectively controlling the application of power thereto, and an auxiliary bailtype handle supported on said housing between said main handle and said cutting blade, a deadman switch arrangement comprising:

normally open secondary switch means in circuit with said primary power switch for preventing power from being supplied to said motor when said secondary switch means is open, said secondary switch means having an actuator pin yieldably biased in a first direction to allow said secondary switch means to remain open, movement of said actuator pin in a direction opposite said first direction causing said secondary switch means to close;

means for supporting said secondary switch means in said housing with said actuator pin extending through an opening in said housing;

a cover member mounted for pivoting movement on said auxiliary handle within an angular range between a first position where said cover member closely overlies said auxiliary handle and a second position where said cover member is angularly spaced from said auxiliary handle;

means for yieldably biasing said cover member toward said second position; and actuating means mounted on said cover member for engaging said secondary switch means actuating pin and moving said secondary switch means actuating pin in said opposite direction to close said secondary switch means as said cover member is moved from said second position toward said first position.

2. The deadman switch arrangement according to claim 1 wherein said actuating means includes a ramped camming surface on said cover member.

3. The deadman switch arrangement according to claim 2 wherein said auxiliary handle has a pair of regions of substantially circular cross section adjacent said housing on opposite sides thereof, said cover member is formed with a pair of aligned saddle portions each conforming to a portion of the exterior surface of said cover member in said regions and situated adjacent to and on opposite sides of said housing, and said ramped camming surface is located on one of said saddle portions.

4. The deadman switch arrangement according to claim 1 wherein said means for yieldably biasing said cover member includes:

a counterbore formed in said cover member, said counterbore being open toward said auxiliary handle;

a spring member disposed in said counterbore; and a pin member disposed in said counterbore over said spring member, said pin member extending out of said counterbore to contact said auxiliary handle when said cover member is within said angular range so as to yieldably bias said cover member toward said second position.

* * * * *